(12) United States Patent
Taima

(10) Patent No.: US 6,536,931 B2
(45) Date of Patent: Mar. 25, 2003

(54) LIGHTING DEVICE FOR ELECTRONIC APPARATUS AND LIGHTING METHOD FOR ELECTRONIC APPARATUS

(75) Inventor: Toru Taima, Yamagata (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/727,498

(22) Filed: Dec. 4, 2000

(65) Prior Publication Data

US 2001/0002880 A1 Jun. 7, 2001

(30) Foreign Application Priority Data

Dec. 6, 1999 (JP) .......................................... 11-346834

(51) Int. Cl.⁷ .............................................. G09F 13/00
(52) U.S. Cl. ...................................... 362/551; 362/554
(58) Field of Search ................................ 362/806, 551, 362/554, 558, 559, 560, 511, 561, 335, 341, 351; 349/61, 62, 63, 65, 67

(56) References Cited

U.S. PATENT DOCUMENTS

| | | | | |
|---|---|---|---|---|
| 4,975,809 A | * | 12/1990 | Ku | 362/104 |
| 5,097,396 A | * | 3/1992 | Myers | 362/29 |
| 5,406,268 A | * | 4/1995 | Fullmer | 340/815.42 |
| 5,542,016 A | * | 7/1996 | Kaschke | 362/556 |
| 2001/0050667 A1 | * | 12/2001 | Kim et al. | 345/102 |

FOREIGN PATENT DOCUMENTS

| | | |
|---|---|---|
| JP | 4-94467 | 8/1992 |
| JP | 5-273551 | 10/1993 |
| JP | 11-509352 | 8/1999 |

* cited by examiner

Primary Examiner—Sandra O'Shea
Assistant Examiner—John Amarantides
(74) Attorney, Agent, or Firm—Whitham, Curtis & Christofferson, PC

(57) ABSTRACT

Light for backlight to illuminate an LCD is irregularly reflected on a reflection plate. Part of the light leaks from the reflection plate to a rear surface side thereof. An aspherical lens collects the leakage light. Optical fibers guide the collected light to an object to be illuminated. The leakage light which inevitably leaks from the reflection plate and which has been wasted can be efficiently used. It is also advantageous to positively increase the leakage light such that the quantity of leakage light thus obtained is more than that of the leakage light inevitably appearing in a natural condition. Since the extension of the optical fibers is of side irregular reflection type, light sources can be provided at arbitrary locations thereof By efficiently using light for the backlight, the user's operating section can be illuminated while completely minimizing power consumption. The leakage part of light for the backlight from the irregular reflection plate can be efficiently used.

12 Claims, 2 Drawing Sheets

LIGHTING DEVICE FOR ELECTRONIC APPARATUS AND LIGHTING METHOD FOR ELECTRONIC APPARATUS

BACKGROUND OF THE INVENTION

The present invention relates to a lighting device for electronic apparatus and a lighting method for electronic apparatus, and in particular, to a lighting device for electronic apparatus and a lighting method for electronic apparatus capable of lighting a user's operating section such as a keyboard of a portable personal computer in which power consumption is desired to be minimized.

DESCRIPTION OF THE PRIOR ART

In a portable personal computer, it is desired to possibly reduce power consumed by the computer. Since the portable personal computer is often used in a dark place or environment, a user's operating section to be visually operated by the user, for example, a keyboard is required to be lighted. As well known, Japanese Utility Model Laid-Open Publication No. Hei 4-94467 describes such an electronic apparatus of power saving type. In the apparatus, a portion of backlight to illuminate a surface of a liquid crystal display (LCD) is employed to light an input device such as a keyboard. Since this known method directly uses the backlight, the quantity of light effectively used on the surface of the liquid crystal display is accordingly decreased. Namely, this is not sufficient for the power saving purpose.

It is desired to light the user's operating section by using the backlight while completely saving power consumed.

SUMMARY OF THE INVENTION

It is therefore an object of the present invention to provide a lighting device for electronic apparatus and a lighting method for electronic apparatus which can light the user's operating section by the backlight while completely saving power consumption.

Another object of the present invention is to provide a lighting device for electronic apparatus and a lighting method for electronic apparatus which can efficiently use part of light, namely, leakage of the backlight via an irregular reflection plate.

The objects are achieved as follows. In the description, reference numerals or the like are enclosed with parentheses to represent technical items. The reference numerals are the same as those assigned to technological items in at least one of embodiments in accordance with the present invention, and in particular, in embodiments of the present invention and drawings associated therewith. The reference numerals explicitly indicate a relationship and association of technical items between the claim and the embodiments. However, the present invention is not restricted by the relationship and association.

To achieve the object above, there is provided a lighting device for electronic apparatus comprising a liquid crystal display (LCD; 1), a light source (2) for emitting light for a backlight to illuminate said LCD, a reflection plate (5) for irregularly reflecting the light for the backlight, a light collecting optical system (6) for collecting leakage part of the light for the backlight, the leakage part leaking from said reflection plate to a rear surface side thereof, and a guide optical system (8) for guiding the light collected by said light collecting optical system toward an object to be illuminated. The leakage light which inevitably leaks from the reflection plate and which has been wasted can be efficiently used. It is also advantageous to positively increase the leakage light such that the quantity of leakage light thus obtained is more than that of the leakage light inevitably appearing in a natural condition.

In accordance with the present invention, the object to be illuminated is a keyboard (11), an ornament, or the like. To enhance decorative features, it is favorable to dispose a color changing section such as a filter between the light collecting optical system (6) and the object to be illuminated. The light collecting optical system (6) is desirably an aspherical lens (7) arranged on a rear surface side of the reflection plate (5). An aspherical lens is thin and has a short focal length. A plurality of aspherical lenses (7) are disposed to increase quantity of light collected.

In accordance with the present invention, the guide optical system (8) includes optical fiber(s) (9). The optical fiber(s) is/are extended to the object to be illuminated. The fibers having a high light guiding characteristic can guide the collected light up to the object to be illuminated. The leakage portion of light for the backlight can be efficiently used.

In accordance with the present invention, the object to be illuminated is a keyboard. The optical fibers are of side surface irregular reflection type and can illuminate a lot of arbitrary locations.

In accordance with the present invention, there is provided a lighting method for electronic apparatus, comprising the step of guiding, to an object to be illuminated, using the leakage light from an irregular reflection plate.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
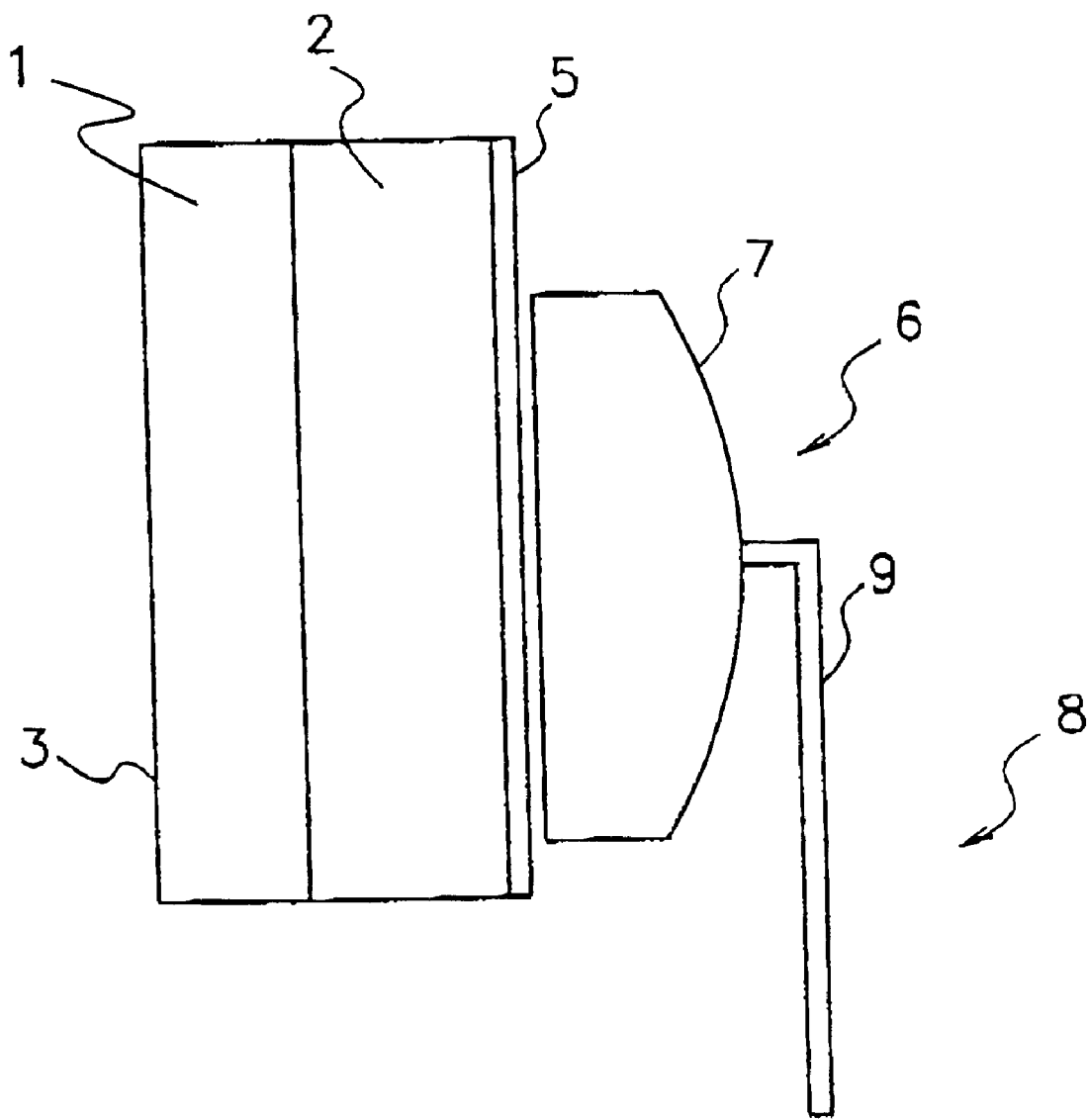
FIG. 1 is a side view schematically showing an embodiment of a lighting device for electronic apparatus in accordance with the present invention.

As can be seen from the drawings of the embodiment of a lighting device for electronic apparatus in accordance with the present invention, the embodiment includes an LCD panel 1 disposed together with a light source 2. The LCD panel 1 is placed on a front surface side of the light source 2. The LCD panel 1 includes a front surface. The front surface is formed as an LCD panel display screen 3. The light source 2 emits light for a backlight to illuminate a rear surface of the LCD panel display screen 3.

On a rear surface side of the light source 2, a reflection plate 5 is disposed to irregularly reflect the light for the backlight. The reflection plate 5 has high efficiency of irregular reflection and has light transmission (transparency) to a certain extent. On a rear surface side of the reflection plate 5, a light collecting optical system 6 is arranged. The optical system 6 can collect light leaked, the light being from the light for the backlight, which is affixed toward the rear-surface side of the reflection plate 5.

The light collecting optical system 6 may include a lens 7. Desirably, the lens 7 is an aspherical lens and has a short focal length. The lens 7 is desirably small in thickness, namely, is favorably a Fresnel lens. The lens 7 may be other than a single lens, namely, may be a compound lens including a plurality of light collecting lenses.

Figure 2:
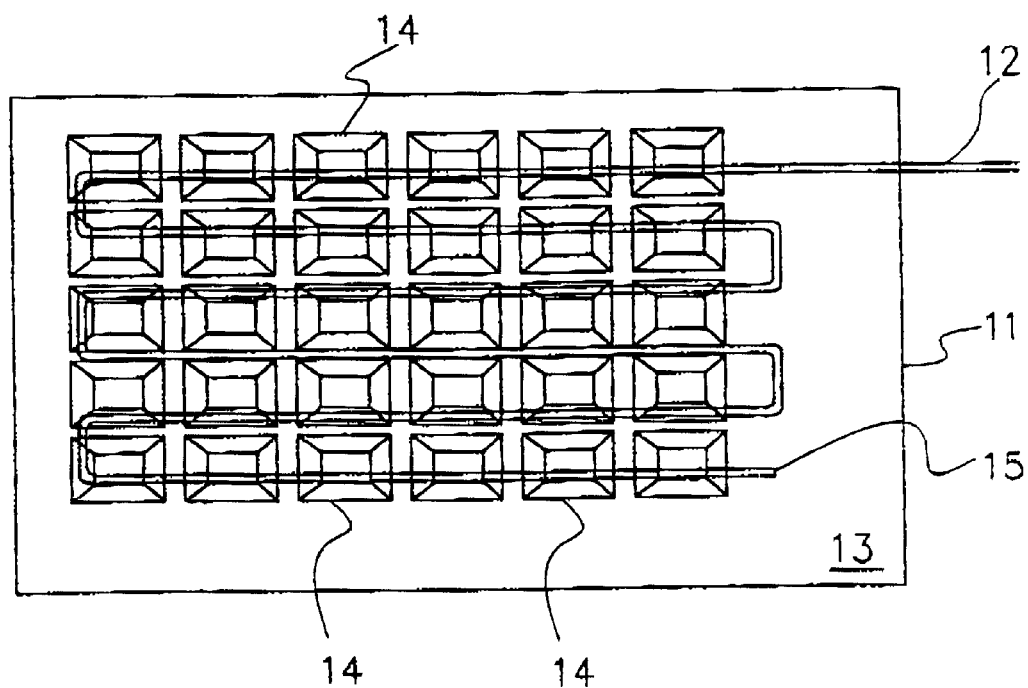
FIG. 2 is a plan view showing a layout of a keyboard.
Figure 3:
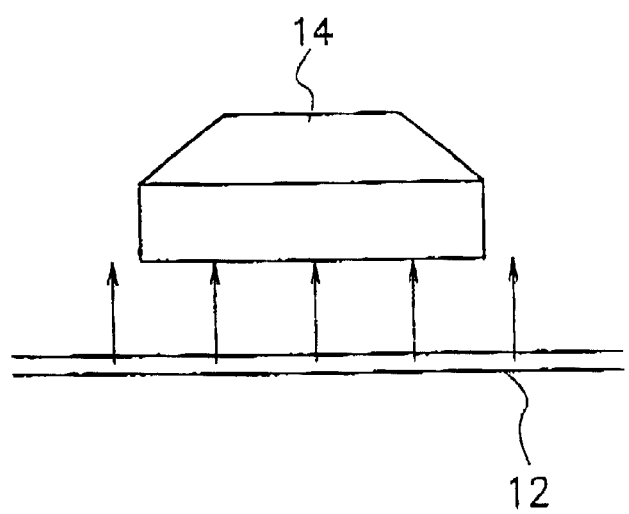
FIG. 3 is a diagram for explaining an optical analysis of leakage light.

The light collecting optical system 6 is optically linked with a guide optical system 8. The optical system 8 includes an optical fiber 9 to efficiently guide light. A plurality of optical fibers 9 are arranged in association with the number of lenses of the compound lens. The fibers 9 extend up to a keyboard 11 shown in FIG. 2. The optical fibers 9 include an optical fiber extended section 12 formed in a single line. The extended section 12 is folded a plurality of times in a wiring layout on a surface 13 of user's operating section.

Along the wiring layout of the single line of the extended section 12, many input keys 14 are arranged. The keys 14 are made of a transparent or semitransparent material. The fiber extension 12 is disposed between a surface of a main body of the keyboard 11 and a rear surface of the input keys 14. The extended section 12 is an item of side surface irregular reflection (side surface emission) type. Light for the backlight proceeds through the extended section 12 in a direction of an optical axis thereof (in a direction in which the optical fibers extend). A part of the light (light leaked from the reflection plate 5: guided light) leaks from particular locations of a side surface, i.e., a cylindrical surface of the extended section 12 into an outer space through irregular reflection or semi-transparency. The optical fiber extended section 12 includes an edge surface. The edge surface is formed as a total reflection surface 15 on which light reflects almost completely.

The light emitted from the light source 2 for the backlight directly enters the LCD panel 1. The light illuminates the LCD panel display screen 3 and irregularly reflects on the reflection plate 5 to resultantly light the LCD panel display screen 3. The reflection plate 5 irregularly reflects light and slightly passes light therethrough. The light for the backlight having passed the reflection plate 5 is collected by the lens 7 to enter the optical fibers 9 from the edge surfaces thereof. An appropriate quantity of the light guided in the optical fibers 9 leaks from the fiber extension 12 through irregular reflection or semi-transparency. The leakage light illuminates each input key 14 corresponding to a leakage location of the light. On the total reflection surface 15, the light for the backlight is reflected. The reflected light is employed to illuminate the input keys 14.

The optical fiber guides light quite well and hence efficiently guides the leakage light from the reflection plate 5 to an object to be illuminated. An optical fiber of side surface emission type provides light emission sources at arbitrary locations thereof. Consequently, the system requires only a single line of optical fiber or few lines of optical fiber. A reflection plate having a high characteristic of irregular reflection has a light transmission characteristic and passes light therethrough. Leakage of the light for the backlight is inevitable and such leakage light is not effectively used, namely, is wasted in the prior art.

In a lighting device for electronic apparatus and a lighting method for electronic apparatus in accordance with the present invention, the portion of light for the backlight which has been inevitably wasted can be efficiently used in a dark environment. The portion of light is employed to illuminate a keyboard, a decorative section, and the like.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A lighting device for an electronic apparatus, comprising:
    a liquid crystal display (LCD);
    a backlight affixed to a rear surface of said LCD to illuminate said LCD;
    a reflection plate affixed to a rear surface of said backlight for irregularly reflecting the light from said backlight, said reflection plate being transparent to a certain extent to allow light transmission of leakage light therethrough;
    a light collecting optical system for collecting leakage light from said reflection plate which passes through said reflection plate; and
    an optical system for guiding the light collected by said light collecting optical system toward an object to be illuminated.

2. A lighting device for electronic apparatus in accordance with claim 1, wherein said object to be illuminated is a keyboard.

3. A lighting device for electronic apparatus in accordance with claim 1, wherein said light collecting optical system is an aspherical lens disposed on a rear surface side of said reflection plate.

4. A lighting device for electronic apparatus in accordance with claim 1, wherein said light collecting optical system is a plurality of an aspherical lens disposed on a rear surface side of said reflection plate.

5. A lighting device for electronic apparatus in accordance with claim 1, wherein said guide optical system includes optical fibers, the optical fibers being extended to said object to be illuminated.

6. A lighting device for electronic apparatus in accordance with claim 1, wherein:
    said guide optical system includes optical fibers, the optical fibers being extended to said object to be illuminated,
    said object to be illuminated is a keyboard; and
    said optical fibers are of side surface irregular reflection type.

7. A lighting device for electronic apparatus in accordance with claim 1, wherein:
    said object to be illuminated is a keyboard; and
    said guide optical system includes optical fibers, the optical fibers being extended to said object to be illuminated.

8. A lighting device for electronic apparatus in accordance with claim 1, wherein:
said object to be illuminated is a keyboard; and
said guide optical system includes optical fibers, the optical fibers being extended to said object to be illuminated said optical fibers are of side surface irregular reflection type.

9. A lighting device for electronic apparatus in accordance with claim 1, wherein:
said object to be illuminated is a keyboard,
said guide optical system includes optical fibers, the optical fibers being extended to said object to be illuminated said optical fibers are of side surface irregular reflection type, and
said optical fibers are in the form of a single line, the single line being arranged through a rear surface side of a plurality of keys of said keyboard.

10. A lighting device for electronic apparatus in accordance with claim 1, further including a color changing section between said light collecting optical system and said object to be illuminated.

11. A lighting device for electronic apparatus in accordance with claim 1, wherein said object to be illuminated is an ornament.

12. A lighting method for an electronic apparatus, comprising the step of guiding, to an object to be illuminated, a leakage portion of illumination light emitted from a light emitting section through an irregular reflection plate that is affixed to the light emitting section and is transparent to a certain extent to allow light transmission of leakage light therethrough.

* * * * *